United States Patent
Ogihara

(10) Patent No.: US 10,545,165 B2
(45) Date of Patent: Jan. 28, 2020

(54) PHYSICAL QUANTITY DETECTION CIRCUIT, PHYSICAL QUANTITY DETECTOR, ELECTRONIC APPARATUS AND MOVING OBJECT

(71) Applicant: Seiko Epson Corporation, Tokyo (JP)

(72) Inventor: Tsutomu Ogihara, Minowa (JP)

(73) Assignee: Seiko Epson Corporation (JP)

( * ) Notice: Subject to any disclaimer, the term of this patent is extended or adjusted under 35 U.S.C. 154(b) by 873 days.

(21) Appl. No.: 14/258,369

(22) Filed: Apr. 22, 2014

(65) Prior Publication Data

US 2014/0324392 A1  Oct. 30, 2014

(30) Foreign Application Priority Data

Apr. 24, 2013 (JP) ................. 2013-091037

(51) Int. Cl.
| | |
|---|---|
| *G01C 19/00* | (2013.01) |
| *G01P 15/00* | (2006.01) |
| *G01P 3/00* | (2006.01) |
| *G01P 15/09* | (2006.01) |
| *G01P 15/097* | (2006.01) |
| *G01C 19/5776* | (2012.01) |

(52) U.S. Cl.
CPC .......... *G01P 15/00* (2013.01); *G01C 19/5776* (2013.01); *G01P 15/097* (2013.01); *G01P 15/0922* (2013.01)

(58) Field of Classification Search
None
See application file for complete search history.

(56) References Cited

U.S. PATENT DOCUMENTS

| | | | | |
|---|---|---|---|---|
| 4,561,065 A | * | 12/1985 | Matsuda ............... | G06F 7/5443 708/320 |
| 4,777,612 A | * | 10/1988 | Tomimitsu ......... | H03H 17/0275 708/316 |

(Continued)

FOREIGN PATENT DOCUMENTS

| | | |
|---|---|---|
| CN | 1429446 A | 7/2003 |
| JP | 03262987 A * | 11/1991 |

(Continued)

OTHER PUBLICATIONS

Electric Power Group v. Alstom (Case Attached).*

(Continued)

*Primary Examiner* — Janet L Suglo
*Assistant Examiner* — Leonard S Liang
(74) *Attorney, Agent, or Firm* — Harness, Dickey & Pierce, P.L.C.

(57) ABSTRACT

A detection circuit (physical quantity detection circuit) includes a digital calculation circuit (calculation processing unit) that performs calculation processing of generating calculation data in response to magnitude of a physical quantity based on detection data formed by digitalization of a detection signal corresponding to the physical quantity. When N is an integer number equal to or larger than two, the digital calculation circuit performs the calculation processing including average processing of calculating an average value of N data values contained in at least one of the detection data and data obtained by performing part of the calculation processing.

6 Claims, 13 Drawing Sheets

(56) References Cited

U.S. PATENT DOCUMENTS

| | | | | |
|---|---|---|---|---|
| 5,121,446 | A * | 6/1992 | Yamada | H04N 1/4052 |
| | | | | 382/252 |
| 5,315,301 | A * | 5/1994 | Hosotani | H03M 1/0643 |
| | | | | 341/156 |
| 5,371,842 | A * | 12/1994 | Easton | G01R 13/0227 |
| | | | | 345/440 |
| 5,644,082 | A | 7/1997 | Iwata et al. | |
| 5,671,159 | A * | 9/1997 | Morita | G08B 29/24 |
| | | | | 340/587 |
| 5,761,074 | A * | 6/1998 | Nakamura | G01D 1/02 |
| | | | | 324/143 |
| 6,317,071 | B1 | 11/2001 | Kolsrud et al. | |
| 6,469,492 | B1 * | 10/2002 | Britz | G01R 29/04 |
| | | | | 324/132 |
| 6,505,143 | B1 * | 1/2003 | Lakshminarasimha | |
| | | | | G05B 19/4065 |
| | | | | 702/183 |
| 6,606,600 | B1 * | 8/2003 | Murgia | G10L 19/0208 |
| | | | | 704/205 |
| 6,671,336 | B1 * | 12/2003 | Zarubinsky | H03C 3/40 |
| | | | | 375/345 |
| 2003/0039325 | A1 * | 2/2003 | Watanabe | G01C 19/5649 |
| | | | | 375/346 |
| 2004/0037584 | A1 * | 2/2004 | Takahashi | H04N 1/053 |
| | | | | 399/100 |
| 2006/0265176 | A1 * | 11/2006 | Yamauchi | G01K 1/022 |
| | | | | 702/130 |
| 2008/0103733 | A1 * | 5/2008 | Thiel | G05B 9/02 |
| | | | | 702/189 |
| 2008/0174450 | A1 * | 7/2008 | Tanizawa | G01D 5/246 |
| | | | | 340/870.2 |
| 2009/0217757 | A1 * | 9/2009 | Nozawa | G01C 19/5607 |
| | | | | 73/504.12 |
| 2010/0054281 | A1 * | 3/2010 | Terazawa | G01C 19/00 |
| | | | | 370/480 |
| 2010/0087966 | A1 * | 4/2010 | Terazawa | G05D 3/12 |
| | | | | 700/302 |
| 2010/0169028 | A1 * | 7/2010 | Shiraki | G01N 29/32 |
| | | | | 702/56 |
| 2012/0022824 | A1 | 1/2012 | Chino | |
| 2013/0055810 | A1 * | 3/2013 | Yanagisawa | G01C 19/56 |
| | | | | 73/504.12 |
| 2013/0055815 | A1 * | 3/2013 | Yanagisawa | G01C 19/5649 |
| | | | | 73/579 |
| 2013/0057354 | A1 * | 3/2013 | Yanagisawa | G01C 19/5726 |
| | | | | 331/156 |
| 2013/0093770 | A1 * | 4/2013 | Loewenstein | G01R 29/26 |
| | | | | 345/440 |
| 2013/0097111 | A1 * | 4/2013 | Loewenstein | G01R 29/26 |
| | | | | 706/52 |
| 2013/0097112 | A1 * | 4/2013 | Loewenstein | G01R 29/26 |
| | | | | 706/52 |
| 2014/0318244 | A1 * | 10/2014 | Tsutsumi | G01C 19/5776 |
| | | | | 73/504.12 |
| 2014/0324375 | A1 * | 10/2014 | Seo | G01P 21/00 |
| | | | | 702/104 |
| 2015/0033821 | A1 * | 2/2015 | Mangano | G01C 25/005 |
| | | | | 73/1.77 |
| 2015/0204690 | A1 * | 7/2015 | Shimada | G01C 19/5776 |
| | | | | 702/96 |
| 2016/0187136 | A1 * | 6/2016 | Murakami | G01P 15/097 |
| | | | | 73/504.12 |
| 2016/0282116 | A1 * | 9/2016 | Haneda | H03K 5/13 |
| 2017/0131099 | A1 * | 5/2017 | Aoyama | G01C 19/5642 |

FOREIGN PATENT DOCUMENTS

| | | | |
|---|---|---|---|
| JP | 08-014934 A | | 1/1996 |
| JP | 10062257 A | * | 3/1998 |
| JP | 2002-118463 A | | 4/2002 |
| JP | 2007-327943 A | | 12/2007 |
| JP | 2009-229447 A | | 10/2009 |
| JP | 2012-026825 A | | 2/2012 |
| JP | 2016197050 A | * | 11/2016 |
| JP | 2017227591 A | * | 12/2017 |
| JP | 2018136255 A | * | 8/2018 |
| JP | 2018165641 A | * | 10/2018 |
| WO | WO-2001-089169 A1 | | 11/2001 |

OTHER PUBLICATIONS

Machine Translation for JP20160197050 (Year: 2016).*
Machine Translation for JP2017227591 (Year: 2017).*
Machine Translation for JP2018136255 (Year: 2018).*
Machine Translation for JP2018165641 (Year: 2018).*
Machine Translation for JP03262987A (Year: 1991).*
Machine Translation for JP10062257A (Year: 1998).*

* cited by examiner

PHYSICAL QUANTITY DETECTION CIRCUIT, PHYSICAL QUANTITY DETECTOR, ELECTRONIC APPARATUS AND MOVING OBJECT

BACKGROUND

1. Technical Field

The present invention relates to a physical quantity detection circuit, a physical quantity detector, an electronic apparatus and a moving object.

2. Related Art

Presently, physical quantity detectors that can detect various physical quantities such as acceleration sensors for detecting acceleration and gyro sensors for detecting angular velocities are widely used in various kinds of systems and electronic apparatuses. Recently, the physical quantity detectors have been mounted on automobiles etc., and higher detection accuracy and higher reliability have been required even under noisy environments.

Physical quantity detectors that output detection information of physical quantities as digital signals may secure higher reliability even under noisy environments by outputting digital signals having high tolerances for noise. For example, Patent Document 1 (JP-A-2009-229447) has proposed a physical quantity measuring device including a detection circuit that detects an analog signal output from a vibrator using a detector circuit, and then, converts the detected signal into a digital signal using an A/D converter and outputs the signal. In the physical quantity measuring device disclosed in Patent Document 1, the detection circuit is an analog circuit, and it is conceivable that the circuit is replaced by a digital circuit for improvement of detection accuracy. For example, Patent Document 2 (JP-A-2007-327943) has disclosed that, in a detector including a detection circuit having a filter unit, a discrete time filter (SCF) forming the filter unit can be replaced by a digital filter.

However, in the physical quantity detector of related art, output data to be output is updated at a sampling rate, and there has been a problem that, when the sampling rate of the output data by the downstream device is lower than the sampling rate of the physical quantity detector, part of the output data is not sampled and strongly affected by noise.

SUMMARY

An advantage of some aspects of the invention is to provide a physical quantity detection circuit that can reduce noise of output data even when a downstream sampling rate is relatively low, and a physical quantity detector, an electronic apparatus and a moving object using the physical quantity detection circuit.

The invention can be implemented as the following forms or application examples.

Application Example 1

A physical quantity detection circuit according to this application example includes a calculation processing unit that performs calculation processing of generating calculation data in response to magnitude of a physical quantity based on detection data formed by digitalization of a detection signal corresponding to the physical quantity, wherein, when N is an integer number equal to or larger than two, the calculation processing includes average processing of calculating an average value of N data values contained in at least one of the detection data and data obtained by performing part of the calculation processing.

According to the physical quantity detection circuit of this application example, when the downstream sampling rate is relatively low, the output data is averaged, thereby, low-frequency noise including thermal noise is cancelled out, and thus, the influence of noise may be reduced.

Application Example 2

In the physical quantity detection circuit according to the application example described above, the calculation processing unit may generate the calculation data at a rate of 1/N of a sampling rate of the digitalization of the detection signal.

According to this physical quantity detection circuit of the application example, the rate for generation of the output data may be made lower.

Application Example 3

The physical quantity detection circuit according to the application example described above may include a register that sets the N.

According to the physical quantity detection circuit of this application example, the number of pieces of data to be averaged may be optimized according to the downstream sampling rate.

Application Example 4

In the physical quantity detection circuit according to the application example described above, the calculation processing unit may perform the average processing at the end of the calculation processing.

According to the physical quantity detection circuit of this application example, noise generated in all upstream processing of the average processing may be effectively reduced.

Application Example 5

In the physical quantity detection circuit according to the application example described above, the calculation processing may include offset correction processing and sensitivity correction processing on the data generated by the average processing.

According to the physical quantity detection circuit of this application example, the amount of calculation may be reduced by setting the rates of the offset correction processing and the sensitivity correction processing to 1/N of the sampling rate.

Application Example 6

A physical quantity detector according to this application example includes a sensor device that outputs a detection signal corresponding to a physical quantity, and any one of the physical quantity detection circuits described above.

The physical quantity detector according to this application example may be an inertial sensor including an acceleration sensor, a gyro sensor (angular velocity sensor), and a velocity sensor, or a clinometer that measures an inclination angle based on the gravitational force.

Application Example 7

An electronic apparatus according to this application example includes any one of the physical quantity detection circuits described above.

Application Example 8

An electronic apparatus according to this application example includes the physical quantity detection circuit described above, and an information processor that performs information processing based on the calculation data output by the physical quantity detection circuit, wherein a sampling rate $f_1$ of the detection signal in the physical quantity detection circuit is higher than a sampling rate $f_2$ of the calculation data by the information processor.

Application Example 9

In the electronic apparatus according to the application example described above, the N may be defined by the following equation (1):

$$N=\text{round}(f_1/f_2) \tag{1}$$

where round is a function of rounding a value off to an integer.

Application Example 10

A moving object according to this application example includes any one of the physical quantity detection circuits described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, embodiments of the invention will be explained in detail with reference to the drawings. Note that the embodiments described as below do not unduly limit the invention described in the appended claims. All of the configurations explained as below are not necessarily the essential component elements of the invention.

Figure 1:
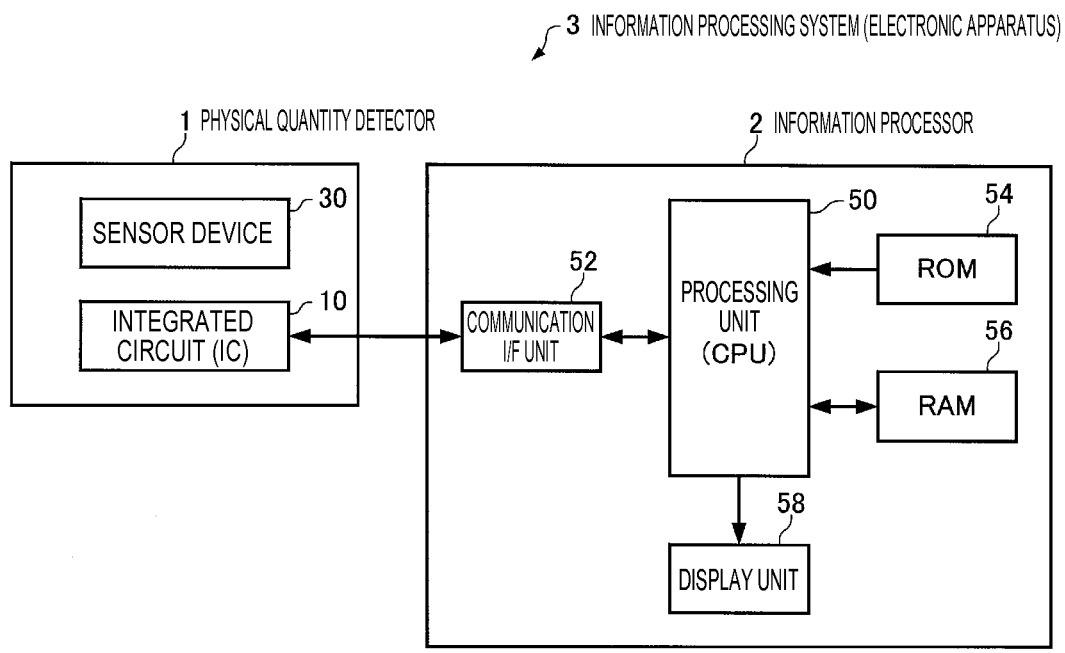
FIG. 1 shows a configuration example of an information processing system or an electronic apparatus of an embodiment.

1. Information Processing System (Electronic Apparatus), Physical Quantity Detector FIG. 1 shows a configuration example of an information processing system or an electronic apparatus of an embodiment. As shown in FIG. 1, the information processing system (electronic apparatus) 3 of the embodiment includes a physical quantity detector 1 and an information processor 2.

The physical quantity detector 1 includes a sensor device 30 that detects a predetermined physical quantity, and an integrated circuit (IC) 10 that generates calculation data in response to the magnitude of the physical quantity detected by the sensor device 30. The physical quantity detector 1 may be an inertial sensor that detects at least a part of a physical quantity including acceleration, an angular velocity, a velocity, angular acceleration, a force, or a clinometer that measures an inclination angle.

The information processor 2 acquires calculation data generated by the physical quantity detector 1 and performs predetermined processing. In the embodiment, the information processor 2 includes a processing unit (CPU: Central Processing Unit) 50, a communication interface unit 52, a ROM (Read Only Memory) 54, a RAM (Random Access Memory) 56, and a display unit 58. Note that the information processor 2 of the embodiment may have a configuration in which part of the component elements (respective parts) of FIG. 1 are omitted or changed or another component element is added.

The processing unit 50 receives the calculation data generated by the physical quantity detector 1 via the communication interface unit 52 and performs various kinds of calculation processing and control processing thereon according to programs stored in the ROM 54 etc. In addition, the processing unit 50 performs processing of transmitting display signals for the display unit 58 to display various kinds of information etc.

The communication interface unit 52 performs various kinds of control for establishing data communication between the processing unit 50 and the physical quantity detector 1.

The ROM 54 stores programs, data, etc. for the processing unit 50 to perform various kinds of calculation processing and control processing.

The RAM 56 is used as a work area of the processing unit 50, and temporarily stores programs and data read out from the ROM 54, calculation results of execution by the processing unit 50 according to the various programs, etc.

The display unit 58 is a display device including an LCD (Liquid Crystal Display) or an organic EL display, and displays various kinds of information based on the display signals input from the processing unit 50.

In the embodiment, the integrated circuit (IC) 10 of the physical quantity detector 1 generates detection data formed by sampling the output signals of the sensor device 30 at a sampling rate $f_1$ and digitalizing the signals. A digital calculation circuit 108, which will be described later, generates data at the sampling rate $f_1$ based on the generated detection data. Then, the N continuous data values contained in the generated data are averaged and the averaged data is updated at a rate of 1/N of the sampling rate $f_1$. Here, the data to be averaged may be the detection data in place of the data generated by the digital calculation circuit 108. In this case, the N continuous data values contained in the detection data are averaged. N is variable in response to a set value. Specifically, N is set in response to the set value saved in a register inside of the integrated circuit 10 by the communication I/F unit 52 of the information processor 2. Further, N is an integer number equal to or larger than two. Therefore, if the sampling rate $f_1$ of the integrated circuit (IC) 10 is higher than a sampling rate $f_2$ for sampling of calculation data by the information processor 2, $N=f_1/f_2$ is set so that the update rate of the calculation data may be the same as the sampling rate of the information processor 2. Note that, even when $f_1/f_2$ is not an integer number, the value of N is not necessarily the same as $f_1/f_2$, but may be nearly the same value as $f_1/f_2$ without departing from the effect of the invention. Further, when $f_1/f_2$ is not an integer number, the value of N may be determined by the following equation:

$$N=\text{round}(f_1/f_2) \quad (1)$$

where round is a function of rounding a value off to an integer.

As an information processing system (electronic apparatus) 3, various systems (or electronic apparatuses) including a navigation system (or navigation apparatus) that performs calculations of locations and orientations of an object with the physical quantity detector 1 mounted thereon based on the calculation data using the information processor 2 and displays predetermined information, a monitoring system (monitoring apparatus) that monitors conditions of an object, and a position control system (or position control apparatus) that controls positions of the object are considered.

Figure 2:
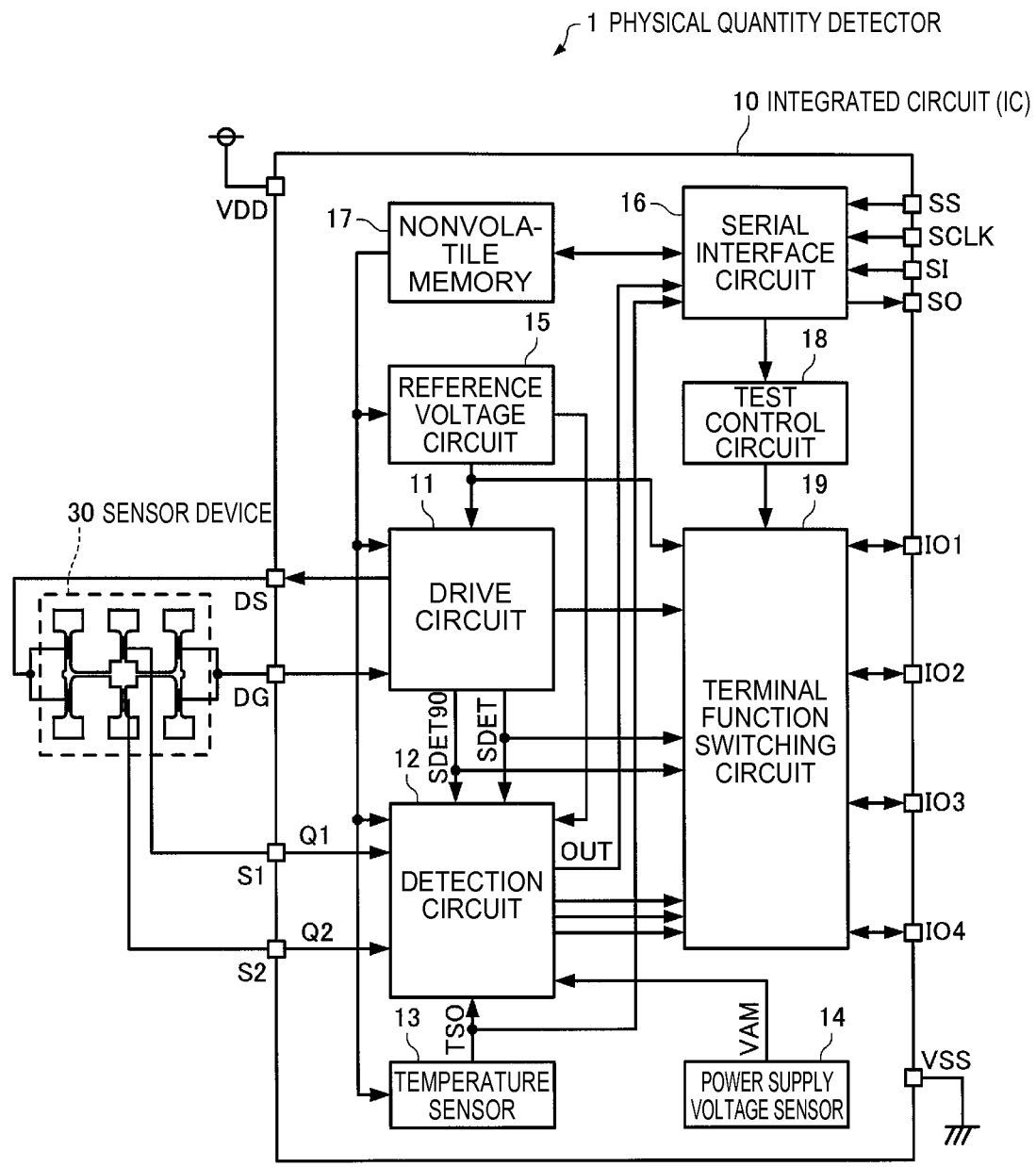
FIG. 2 shows a configuration example of a physical quantity detector of the embodiment.

FIG. 2 shows a configuration example of the physical quantity detector 1 shown in FIG. 1. As shown in FIG. 2, the physical quantity detector 1 of the embodiment includes the integrated circuit (IC) 10 and the sensor device 30.

The sensor device 30 has a vibrating reed on which a drive electrode and a detection electrode are provided, and generally, the vibrating reed is sealed in an airtight package for improvement of oscillation efficiency with the minimum impedance of the vibrating reed. In the embodiment, the sensor device 30 has the so-called double-T vibrating reed having two T-shaped drive vibrating arms.

Figure 3:
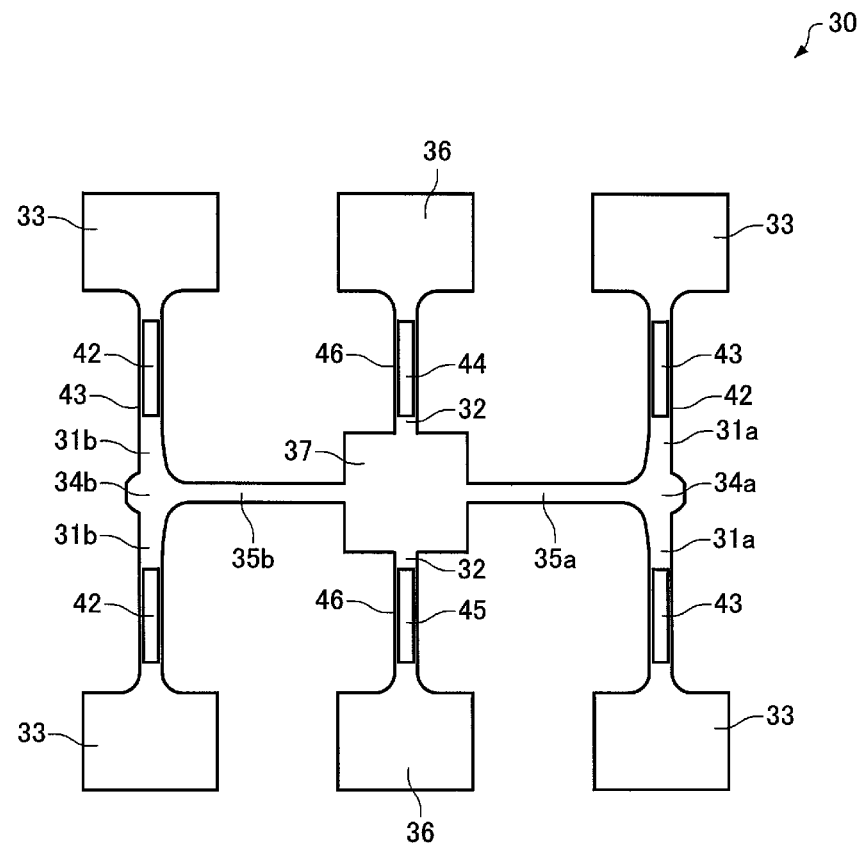
FIG. 3 is a plan view of a vibrating reed of a sensor device.

FIG. 3 is a plan view of the vibrating reed of the sensor device 30. The sensor device 30 has the double-T vibrating reed formed using a Z-cut crystal substrate. The vibrating reed of the crystal material has extremely small variations in resonance frequency with respect to temperature changes, and has an advantage of improving the detection accuracy of the angular velocity. Note that the X-axis, the Y-axis, Z-axis in FIG. 3 show axes of crystal.

As shown in FIG. 3, in the vibrating reed of the sensor device 30, drive vibrating arms 31a, 31b extend from two drive bases 34a, 34b in the +Y-axis direction and the −Y-axis direction, respectively. Drive electrodes 42 and 43 are formed on the side surfaces and the upper surfaces of the drive vibrating arms 31a, respectively, and the drive electrodes 43 and 42 are formed on the side surfaces and the upper surfaces of the drive vibrating arms 31b, respectively.

The drive electrodes 42 and 43 are respectively connected to a drive circuit 11 via a DS terminal and a DG terminal of the integrated circuit (IC) 10 shown in FIG. 2.

The drive bases 34a, 34b are connected to a rectangular detection base 37 via connecting arms 35a, 35b extending in the −X-axis direction and the +X-axis direction, respectively.

Detection vibrating arms 32 extend from the detection base 37 in the +Y-axis direction and the −Y-axis direction. Detection electrodes 44 and 45 are formed on the upper surfaces of the detection vibrating arms 32, and a common electrode 46 is formed on the side surfaces of the detection vibrating arms 32. The detection electrodes 44, 45 are connected to a detection circuit 12 via an S1 terminal and an S2 terminal of the integrated circuit (IC) 10 shown in FIG. 2. Further, the common electrode 46 is grounded.

Figure 4:
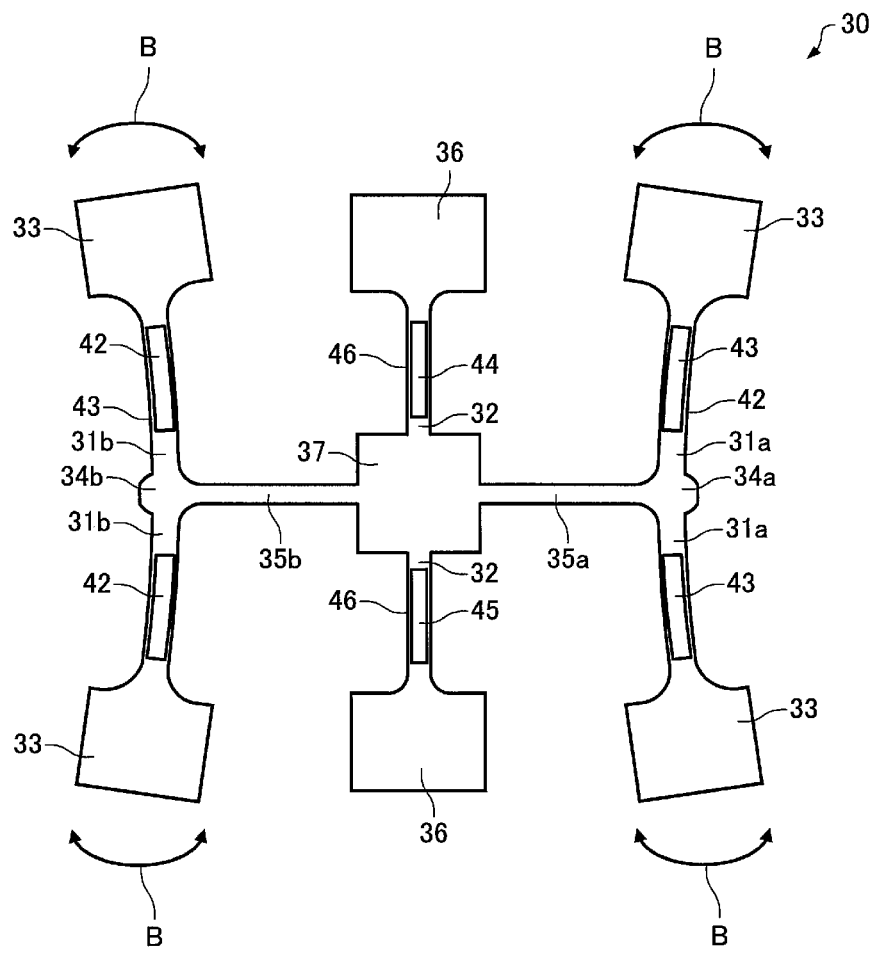
FIG. 4 is a diagram for explanation of a movement of the sensor device.

When alternating-current voltages as drive signals are provided between the drive electrodes 42 and the drive electrodes 43 of the drive vibrating arms 31a, 31b, as shown in FIG. 4, the drive vibrating arms 31a, 31b perform flexural vibrations (excitation vibrations) of ends of the two drive vibrating arms 31a, 31b moving closer to and away from each other as shown by arrows B due to the reverse voltage effect.

Figure 5:
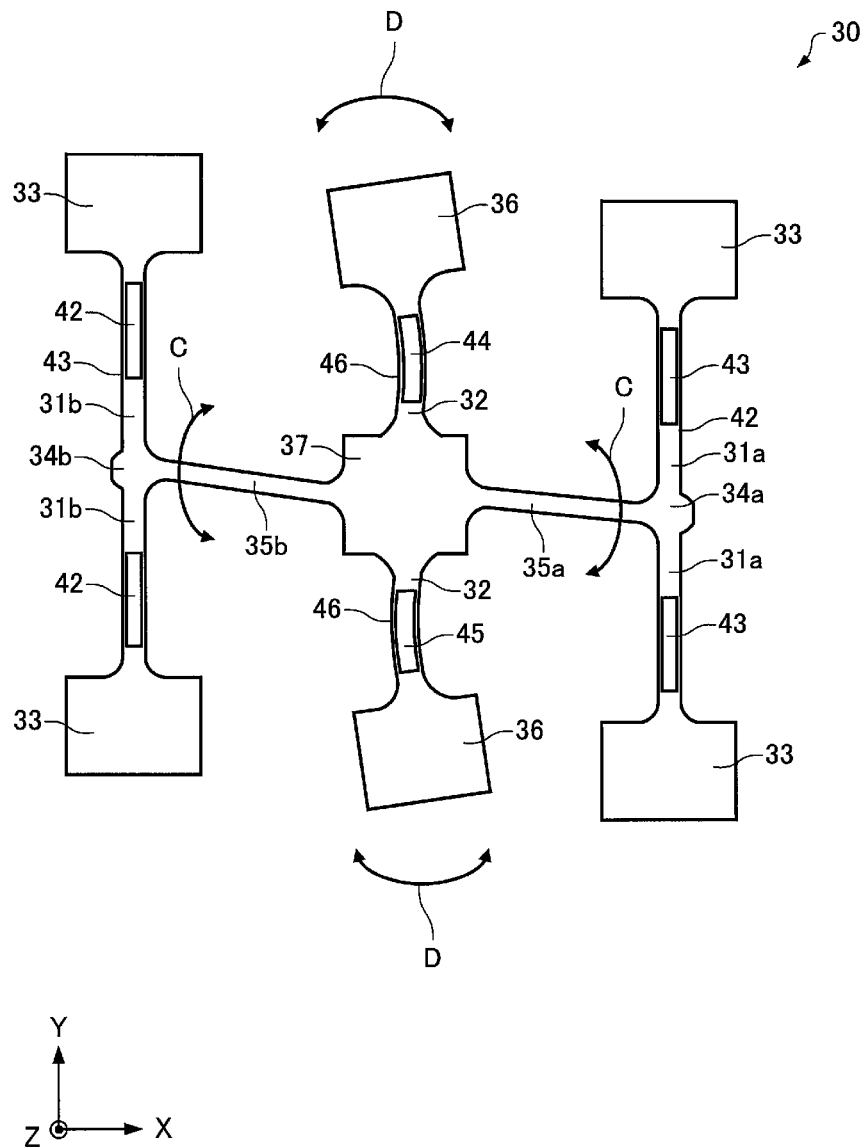
FIG. 5 is a diagram for explanation of a movement of the sensor device.

When an angular velocity around the Z-axis is applied to the vibrating reed of the sensor device 30 under the condition, the drive vibrating arms 31a, 31b obtain a Coriolis force in a direction perpendicular to both the direction of the flexural vibrations of the arrows B and the Z-axis. As a result, as shown in FIG. 5, the connecting arms 35a, 35b vibrate as shown by arrows C. Then, the detection vibrating arms 32 perform flexural vibrations as shown by arrows D in conjunction with the vibrations (arrows C) of the connecting arms 35a, 35b. The flexural vibrations of the detection vibrating arms 32 with the Coriolis force and the flexural vibrations (excitation forces) of the drive vibrating arms 31a, 31b are 90° out of phase with each other.

Now, when the magnitude of the vibration energy or the magnitude of the amplitude of the vibrations when the drive vibrating arms 31a, 31b perform flexural vibrations (excitation forces) are equal between the two drive vibrating arms 31a, 31b, the vibration energy of the drive vibrating arms 31a, 31b is balanced and the detection vibrating arms 32 do not flexurally vibrate under the condition that no angular velocity is applied to the sensor device 30. However, when the balance of the vibration energy of the two drive vibrating arms 31a, 31b is lost, flexural vibrations are generated in the detection vibrating arms 32 even under the condition that no angular velocity is applied to the sensor device 30. The flexural vibrations are called leakage vibrations and the flexural vibrations of the arrows D like the vibrations based on the Coriolis force, but in the same phase with the drive signals.

Then, alternating-current charge based on the flexural vibrations is generated in the detection electrodes 44 and 45 of the detection vibrating arms 32 due to the piezoelectric effect. Here, the alternating-current charge generated based on the Coriolis force changes in response to the magnitude of the Coriolis force (in other words, the magnitude of the angular velocity applied to the sensor device 30). On the other hand, the alternating-current charge generated based on the leakage vibrations is constant regardless of the magnitude of the angular velocity applied to the sensor device 30.

Note that rectangular spindle parts 33 wider than the drive vibrating arms 31a, 31b are formed on the ends of the drive vibrating arms 31a, 31b. The spindle parts 33 are formed on the ends of the drive vibrating arms 31a, 31b, and thereby, the Coriolis force may be increased and a desired resonance frequency may be obtained with relatively short vibrating arms. Similarly, spindle parts 36 wider than the detection vibrating arms 32 are formed on the ends of the detection vibrating arms 32. The spindle parts 36 are formed on the ends of the detection vibrating arms 32, and thereby, the alternating-current charge generated in the detection electrodes 44 and 45 may be increased.

In the above described manner, the sensor device 30 outputs the alternating-current charge (angular velocity component) based on the Coriolis force around the Z-axis as a detection axis and the alternating-current charge (vibration leakage component) based on the leakage vibrations of the excitation vibrations via the detection electrodes 44 and 45.

Returning to FIG. 2, the integrated circuit (IC) 10 includes the drive circuit 11, the detection circuit 12, a temperature sensor 13, a power supply voltage sensor 14, a reference voltage circuit 15, a serial interface circuit 16, a nonvolatile memory 17, a test control circuit 18, and a terminal function switching circuit 19. Note that the integrated circuit (IC) 10 of the embodiment may have a configuration in which part of the elements shown in FIG. 2 are omitted or changed or another element is added.

The reference voltage circuit 15 generates a constant voltage and a constant current including a reference potential (analog ground voltage) from the power supply voltage supplied from a VDD terminal, and supplies them to the drive circuit 11, the detection circuit 12, and the temperature sensor 13.

The nonvolatile memory 17 holds various kinds of trimming data (adjustment data and correction data) with respect to the drive circuit 11, the detection circuit 12, and the temperature sensor 13. The nonvolatile memory 17 may be realized by a MONOS (Metal Oxide Nitride Oxide Silicon) memory, for example.

The temperature sensor 13 generates an analog signal TSO with a voltage nearly linearly changing with respect to temperature change. The temperature sensor 13 may be realized using a bandgap reference circuit, for example.

The power supply voltage sensor 14 A/D-converts the power supply voltage supplied from the VDD terminal and generates power supply voltage data VAM.

The drive circuit 11 generates a drive signal for excitation vibration of the sensor device 30, and supplies the signal to a drive electrode 112 of the sensor device 30 via the DS terminal. Further, a drive current (crystal current) generated in a drive electrode 113 by the excitation vibration of the sensor device 30 is input to the drive circuit 11 via the DG terminal, and the circuit performs feedback control on the amplitude level of the drive signal so that the amplitude of the drive current may be held constant. Furthermore, the drive circuit 11 generates a signal SDET in the same phase with the drive signal and a signal SDET90 out of phase with the drive signal by 90°, and supplies the signals to the detection circuit 12.

Alternating-current charges (detection currents) Q1, Q2 generated in two detection electrodes 114, 115 of the sensor device 30 are input to the detection circuit 12 (an example of the physical quantity detection circuit) via the S1 terminal and the S2 terminal, respectively, and the circuit generates detection data by periodically digitalizing the alternating-current charges Q1, Q2. Then, the circuit generates angular velocity data OUT (an example of calculation data) having a digital code in response to the magnitude of the angular velocity component based on the detection data. As will be described later, the detection circuit 12 performs offset correction and sensitivity correction using the output signal ISO of the temperature sensor 13, the power supply voltage data VAM output by the power supply voltage sensor 14, and the trimming data stored in the nonvolatile memory 17 in the generation processing of the angular velocity data OUT. The angular velocity data OUT generated by the detection circuit 12 is supplied to the serial interface circuit 16.

A selection signal, a clock signal, a serial input signal are input to the serial interface circuit 16 via an SS terminal, an SCLK terminal, and an SI terminal, respectively. The serial interface circuit 16 samples the serial input signal with the clock signal when the selection signal is enabled, and performs analysis processing of a command contained in the serial input signal and processing of converting the serial data contained in the serial input signal into parallel data. Further, the serial interface circuit 16 performs processing of writing (setting) and reading data on the nonvolatile memory 17 and an internal register (not shown) in response to a command. Furthermore, the serial interface circuit 16 performs processing of converting the angular velocity data OUT generated by the detection circuit 12 and the data read out from the nonvolatile memory 17 and the internal register into serial data and outputting the data via an SO terminal.

The terminal function switching circuit 19 switches connection destinations of four terminals of 101, 102, 103, 104. For example, the terminal function switching circuit 19 selects output signals and internal signals of the drive circuit 11, the detection circuit 12, and the reference voltage circuit 15 and externally outputs from one of 101, 102, 103, 104 or supplies a signal externally input from one of 101, 102, 103, 104 to the drive circuit 11, the detection circuit 12, and the reference voltage circuit 15 under the control of the test control circuit 18.

The test control circuit 18 controls switching of the connection destinations of the four terminals of 101, 102, 103, 104 in response to a set value received from the serial interface circuit 16.

Figure 6:
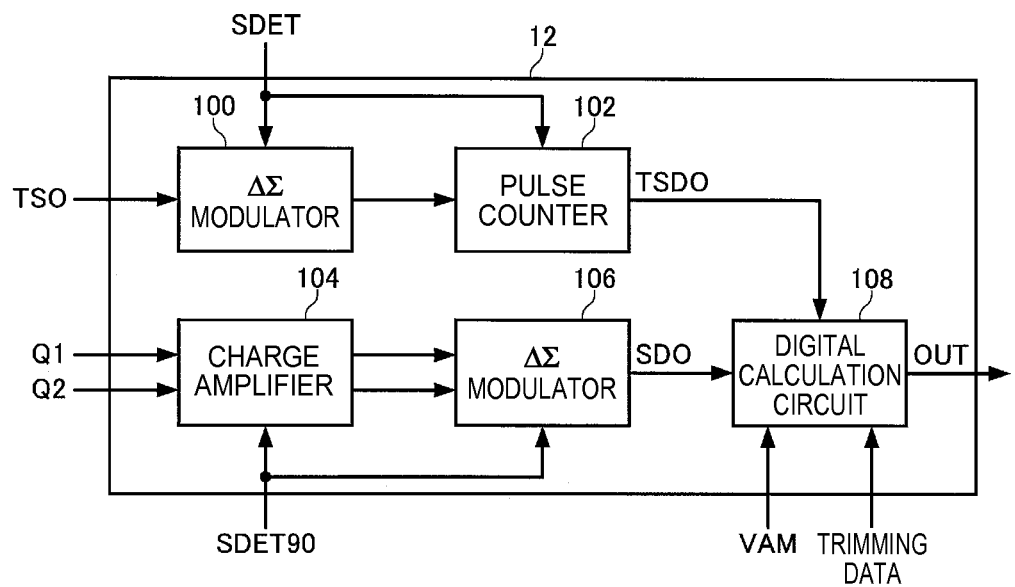
FIG. 6 shows a configuration example of a detection circuit.

FIG. 6 shows a configuration example of the detection circuit 12. As shown in FIG. 6, the detection circuit 12 includes a $\Delta\Sigma$ modulator 100, a pulse counter 102, a charge amplifier 104, a $\Delta\Sigma$ modulator 106, and the digital calculation circuit 108. Note that the detection circuit 12 of the embodiment may have a configuration in which part of the elements shown in FIG. 6 are omitted or changed or another element is added.

The $\Delta\Sigma$ modulator 100 converts the output signal ISO of the temperature sensor 13 into one-bit bit stream data using the signal SDET generated by the drive circuit 11 as a sampling clock.

The pulse counter 102 sequentially adds the bit stream data output by the $\Delta\Sigma$ modulator 100 and generates temperature data TSDO in synchronization with the signal SDET generated by the drive circuit 11.

The charge amplifier 104 integrates the alternating-current charges Q1, Q2 generated from the two detection electrodes of the sensor device 30 in synchronization with the signal SDET90 (the signal out of phase with the drive signal by 90°) generated by the drive circuit 11, and outputs a differential voltage. As described above, in the sensor device 30, the flexural vibrations of the detection vibrating arms 32 with the Coriolis force and the flexural vibrations (excitation forces) of the drive vibrating arms 31a, 31b are 90° out of phase with each other, and thus, the charge amplifier 104 integrates the alternating-current charge (angular velocity component) based on the Coriolis force, but the vibration leakage component is in the same phase with the drive signal and not integrated. Therefore, the differential voltage output by the charge amplifier 104 contains only the angular velocity component.

The ΔΣ modulator 106 converts the differential voltage (angular velocity component) output by the charge amplifier 104 into one-bit bit stream data SDO using the signal SDET90 generated by the drive circuit 11 as a sampling clock. In other words, the ΔΣ modulator 106 as an A/D converter periodically samples and digitalize the differential voltage (angular velocity component) output by the charge amplifier 104 and converts the voltages into one one-bit bit stream data SDO.

The digital calculation circuit 108 (an example of calculation processing unit) performs predetermined calculation processing on the bit stream data SDO output by the ΔΣ modulator 106 using the temperature data TSDO generated by the pulse counter 102, the power supply voltage data VAM output by the power supply voltage sensor 14, and the trimming data stored in the nonvolatile memory 17, and generates angular velocity data OUT having a digital code in response to the magnitude of the angular velocity component.

Figure 7:
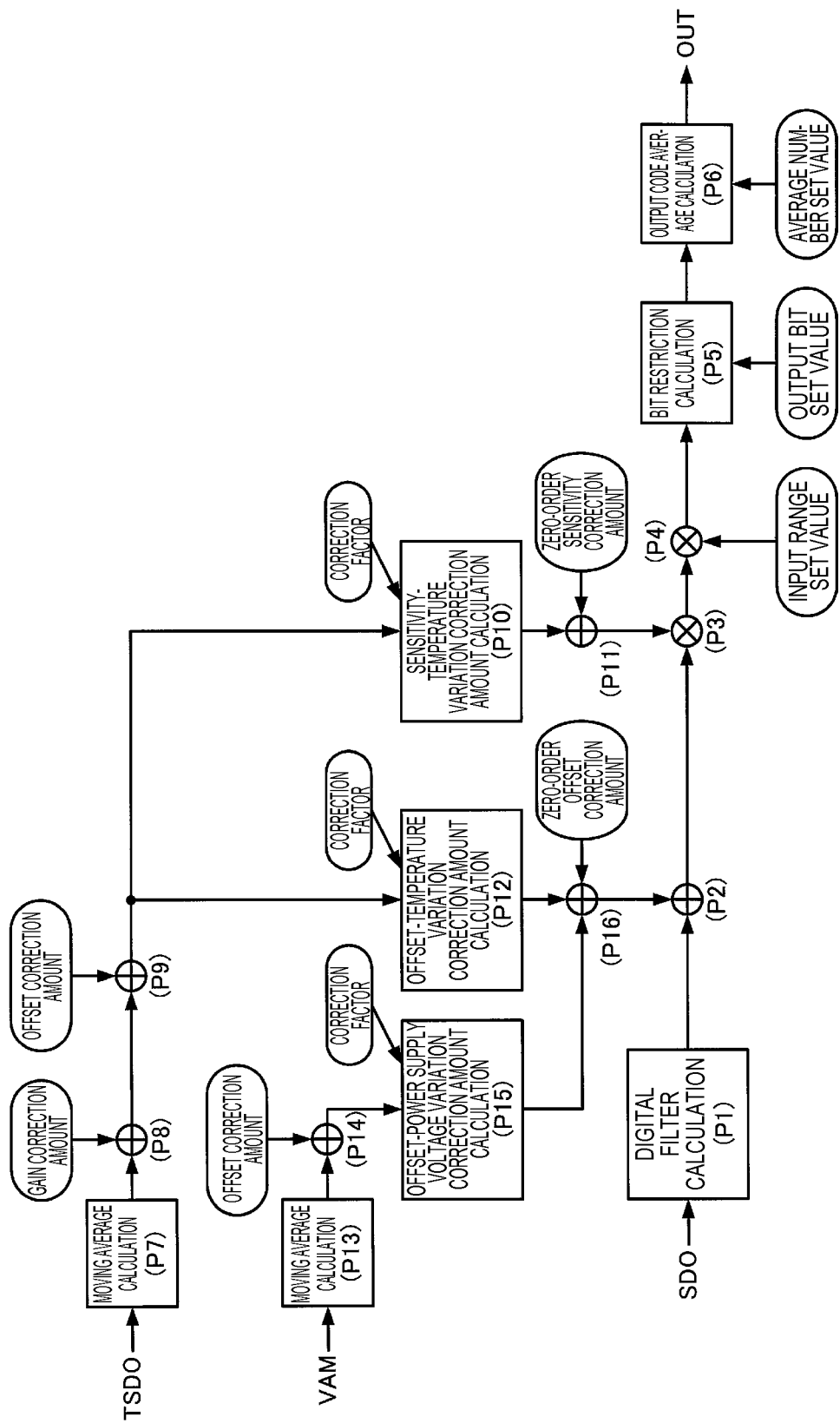
FIG. 7 shows a flow of calculation processing performed by a digital calculation circuit.

FIG. 7 shows a flow of calculation processing performed by the digital calculation circuit 108. As shown in FIG. 7, the digital calculation circuit 108 performs a digital filter calculation (P1) of cutting the high frequency component on the one-bit bit stream data SDO, and generates angular velocity data.

Further, the digital calculation circuit 108 performs an offset correction calculation (P2) of adding an offset correction amount and a sensitivity correction calculation (P3) of multiplying by a sensitivity correction amount on the angular velocity data generated by the digital filter calculation (P1).

Furthermore, the digital calculation circuit 108 multiplies the angular velocity data after the offset correction calculation (P2) and the sensitivity correction calculation (P3) by an input range set value, and performs an input range calculation (P4) of matching the output range of the angular velocity data output by the physical quantity detector 1 with the input range of an IC connected to the downstream of the physical quantity detector 1.

Further, the digital calculation circuit 108 performs a bit restriction calculation (P5) of deleting (shifting) the lower bits of the number of bits in response to an output bit set value and rounding the least significant bit on the angular velocity data after the input range calculation (P4).

Furthermore, the digital calculation circuit 108 performs an output code average calculation (P6) of calculating an average value of the N pieces of angular velocity data after the bit restriction calculation (P5) in response to an average number set value. By the output code average calculation (P6), the angular velocity data OUT is obtained.

In addition, the digital calculation circuit 108 performs a calculation of the offset correction amount used for the offset correction calculation (P2) and a calculation of the sensitivity correction amount used for the sensitivity correction calculation (P3).

Specifically, the digital calculation circuit 108 calculates a moving average of a predetermined number of times (for example, four times) on the temperature data TSDO (P7), and performs addition of a gain correction amount (P8) and addition of the offset correction amount (P9) to the calculation result of the moving average.

Further, the digital calculation circuit 108 performs a sensitivity-temperature variation correction amount calculation (P10) of obtaining an amount of correction of sensitivity variations due to temperature variations (sensitivity-temperature variation correction amount) by assigning the temperature data after the moving average (P7), the gain correction (P8), and the offset correction (P9) to a temperature variable of a correction formula for correction of sensitivity variations of the angular velocity data due to temperature variations (sensitivity-temperature variation correction formula).

Furthermore, the digital calculation circuit 108 performs a sensitivity correction amount calculation (P11) of obtaining a sensitivity correction amount by adding the sensitivity-temperature variation correction amount and a zero-order sensitivity correction amount (a sensitivity correction amount independent of the temperature).

Further, the digital calculation circuit 108 performs an offset-temperature variation correction amount calculation (P12) of obtaining an amount of correction of offset variations due to temperature variations (offset-temperature variation correction amount) by assigning the temperature data after the moving average (P7), the gain correction (P8), and the offset correction (P9) to a temperature variable of a correction formula for correction of offset variations of the angular velocity data due to temperature variations (offset-temperature variation correction formula).

Furthermore, the digital calculation circuit 108 calculates a moving average of a predetermined number of times (for example, four times) on the power supply voltage data VAM (P13), and performs addition of the offset correction amount (P14) to the calculation result of the moving average.

Further, the digital calculation circuit 108 performs an offset-power supply voltage variation correction amount calculation (P15) of obtaining an amount of correction of offset variations due to power supply voltage variations (offset-power supply voltage variation correction amount) by assigning the power supply voltage data after the moving average (P13) and the offset correction (P14) to a temperature variable of a correction formula for correction of offset variations of the angular velocity data due to power supply voltage variations (offset-power supply voltage variation correction formula).

Furthermore, the digital calculation circuit 108 performs an offset correction amount calculation (P16) of obtaining the offset correction amount by adding the offset-temperature variation correction amount, the offset-power supply voltage variation correction amount, and a zero-order offset correction amount (an offset correction amount independent of the temperature and the power supply voltage).

Note that the gain correction amount and the offset correction amount of the temperature data, the offset correction amount of the power supply voltage data, a correction factor of the sensitivity-temperature variation correction formula, a correction factor of the offset-temperature variation correction formula, a correction factor of the offset-power supply voltage variation correction formula, the zero-order offset correction amount, the zero-order sensitivity correction amount, the input range set value, the output bit set value, and the average time set value are part of the trimming data stored in the nonvolatile memory 17.

Note that the calculations of P1 to P6 shown in FIG. 7 are performed at each time when the bit stream data SDO is updated, i.e., at the same rate as the sampling rate of the ΔΣ modulator 106 (e.g., about 3 kHz). On the other hand, the temperature variations and the power supply voltage variations are sufficiently slower than the changes of the angular velocity, and the calculations of P7 to P16 shown in FIG. 7 are performed at the lower rate (e.g., about 12 kHz).

Particularly, in the embodiment, the digital calculation circuit 108 performs the output code average calculation (P6), and thereby, the update rate of the angular velocity data OUT may be made equal to the sampling rate of the information processor 2.

Figure 8:
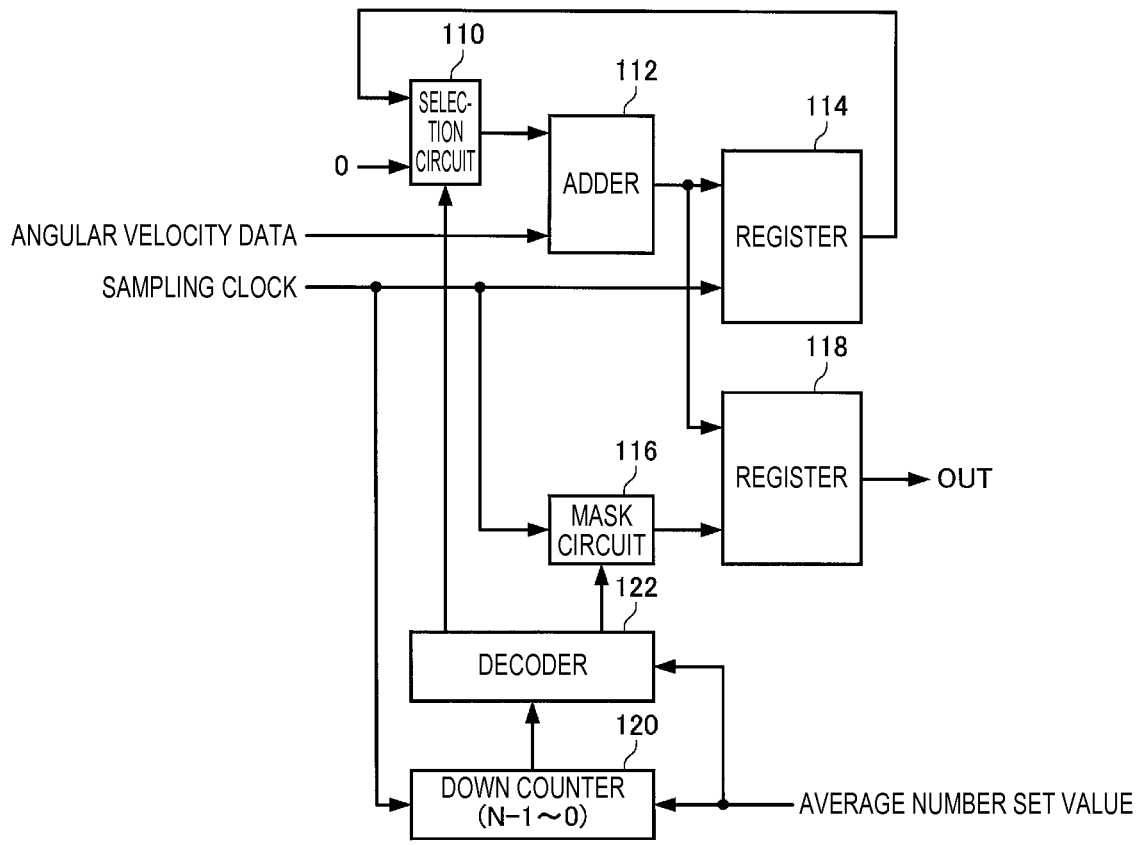
FIG. 8 shows a configuration example of a circuit for output code average calculation.

FIG. 8 shows a configuration example of a circuit for the output code average calculation (P6). Note that, in the circuit of FIG. 8, the average number set value $N=2^m$ (m 0 to M) is set for simplicity of the circuit configuration.

A selection circuit 110 selects and outputs zero or data held in a register 114 in response to a control signal.

An adder 112 adds and outputs the output data of the selection circuit 110 and the input angular velocity data (the angular velocity data after the bit restriction calculation (P5)).

The register 114 holds the output data of the adder 112 at the edge of the sampling clock (the clock at the same rate as SDET90).

A mask circuit 116 propagates the sampling clock to the output or masks the sampling clock not to propagate it to the output in response to a control signal.

A register 118 deletes the lower m bits and holds the output data of the adder 112 at the edge of the sampling clock propagating the mask circuit 116. That is, the output data of the adder 112 is multiplied by $\frac{1}{2}^m$ (=1/N) and held in the register 118. Then, the data held by the register 118 is the final angular velocity data OUT.

The average number set value N is input to a down counter 120, and the down counter down-counts with respect to each edge of the sampling clock, and, when the count value becomes zero, sets the count value to N−1 at the edge of the next sampling clock and repeats down-count.

A decoder 122 decodes the count value of the down counter 120 and generates a control signal of the selection circuit 110 so that the selection circuit 110 may select zero if the count value is N−1 and the selection circuit 110 may select the data held in the register 114 if the count value is other than N−1. Further, the decoder 122 generates a control signal of the mask circuit 116 so that the mask circuit 116 may propagate the sampling clock to the output if the count value is zero and the mask circuit 116 may mask, but not propagate the sampling clock to the output if the count value is other than zero.

Figure 9:
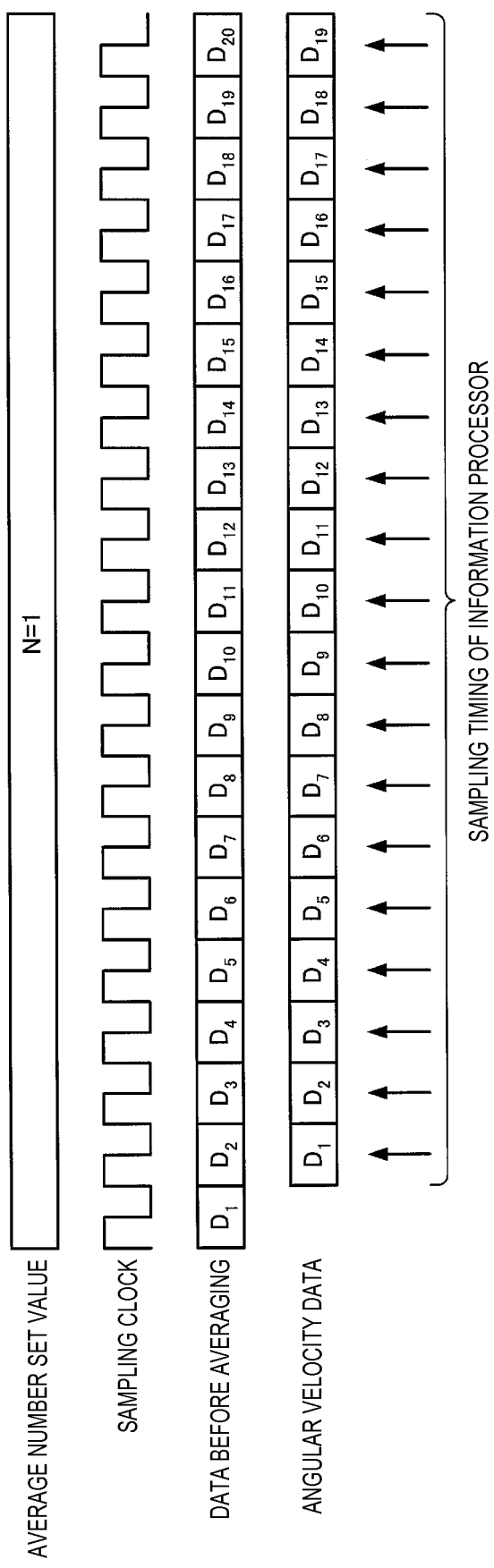
FIG. 9 is a timing chart showing an example of update timing of angular velocity data.

According to the configuration, when N=1 (m=0), the count value of the down counter 120 is constantly zero and the count value of zero is the same as N−1, and the selection circuit 110 constantly selects zero. Therefore, the output data of the adder 112 is the same as the input angular velocity data (the angular velocity data after the bit restriction calculation (P5)). Further, since the count value of the down counter 120 is zero, the mask circuit 116 constantly propagates the sampling clock to the output. Therefore, the output data of the adder 112 (with the lower bits undeleted) is held in the register 118 with respect to each edge of the sampling clock. Thereby, when N=1, the angular velocity data OUT is constantly the same as the previous angular velocity data. FIG. 9 shows an example of update timing of angular velocity data OUT. As shown in FIG. 9, when the sampling rate $f_2$ of the information processor 2 is the same as the sampling rate $f_1$ of the physical quantity detector 1, the average number set value N is set to one, and thereby, the update rate of the angular velocity data OUT may be made the same as the sampling rate $f_2$ of the information processor 2.

Figure 10:
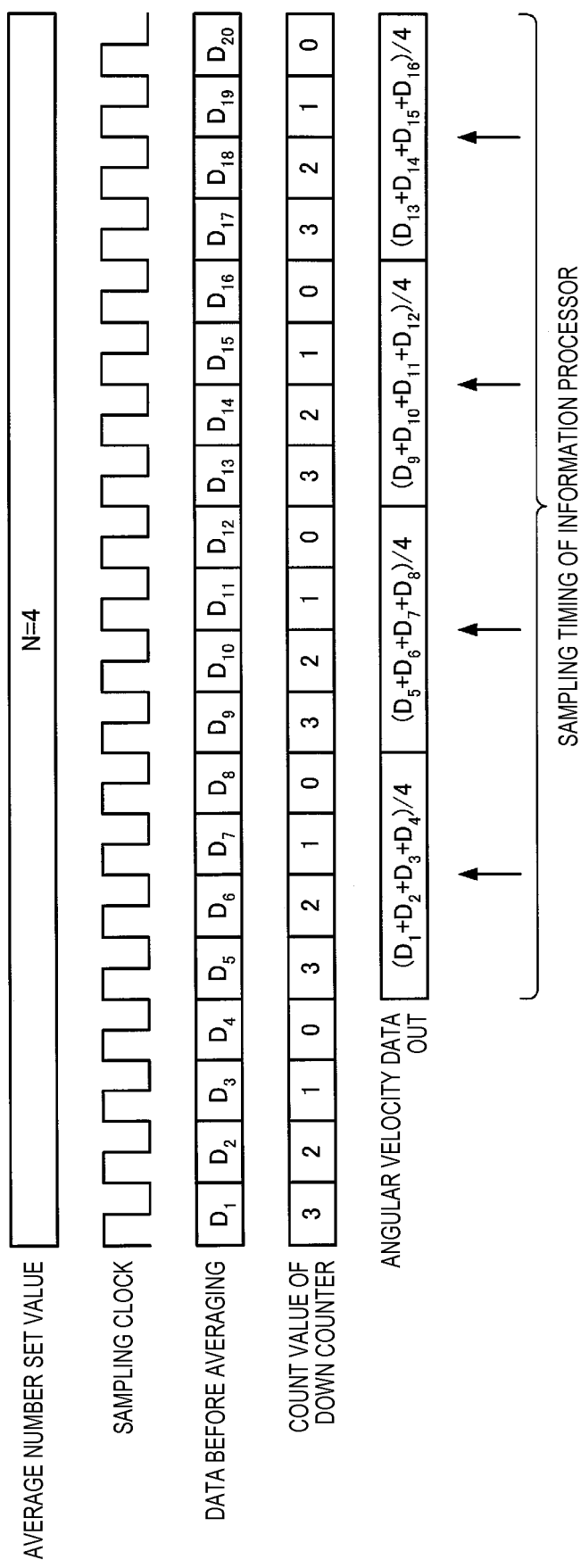
FIG. 10 is a timing chart showing an example of update timing of angular velocity data.

On the other hand, when N≠1 (m≠0), during down-count of the count value of the down counter 122 from N−1 to zero, the average value of sequentially input angular velocity data is calculated and, only when the count value of the down counter 122 is zero, the lower two bits are deleted from the data value obtained by averaging of the N angular velocity data values and the data value is held in the register 118 at the edge of the next sampling clock. Thereby, when N≠1, the N angular velocity data values are averaged at each time when being input, and the angular velocity data OUT is updated. The angular velocity data OUT is updated at the update rate of the register 118, i.e., at the rate of 1/N of the sampling rate. FIG. 10 shows an example of the update timing of the angular velocity data OUT when N=4 (m=2). As shown in FIG. 10, when the sampling rate $f_2$ of the information processor 2 is four times the sampling rate $f_1$ of the physical quantity detector 1, the average number set value N is set to four, and thereby, the angular velocity data OUT obtained by averaging of four data values is output and the update rate thereof may be made the same as the sampling rate $f_2$ of the information processor 2.

Note that, in the circuit of FIG. 8, N angular velocity data values are added, then, the lower m bits are deleted and the values are averaged, however, $2^{m-1}$ may be added to the data obtained by addition of N angular velocity data values, and then, processing of deleting the lower m bits (rounding processing) may be performed.

As explained above, according to the information processing system (the electronic apparatus, the physical quantity detector, the physical quantity detection circuit) of the embodiment, when the sampling rate of the downstream information processor 2 is lower than the sampling rate of the physical quantity detector 1, the output data of the physical quantity detector is averaged, thereby, low-frequency noise including thermal noise is cancelled out, and thus, the influence of noise may be reduced in the processing of the information processor 2.

Further, according to the information processing system (the electronic apparatus, the physical quantity detector, the physical quantity detection circuit) of the embodiment, the average number set value N is variable, and thus, the number of pieces of data to be averaged by the physical quantity detector 1 may be optimized according to the sampling rate of the downstream information processor 2.

Furthermore, according to the information processing system (the electronic apparatus, the physical quantity detector, the physical quantity detection circuit) of the embodiment, the output code average calculation (P6) is performed last, and thereby, the noise generated in all of the upstream processing may be effectively reduced.

2. Electronic Apparatus

Figure 11:
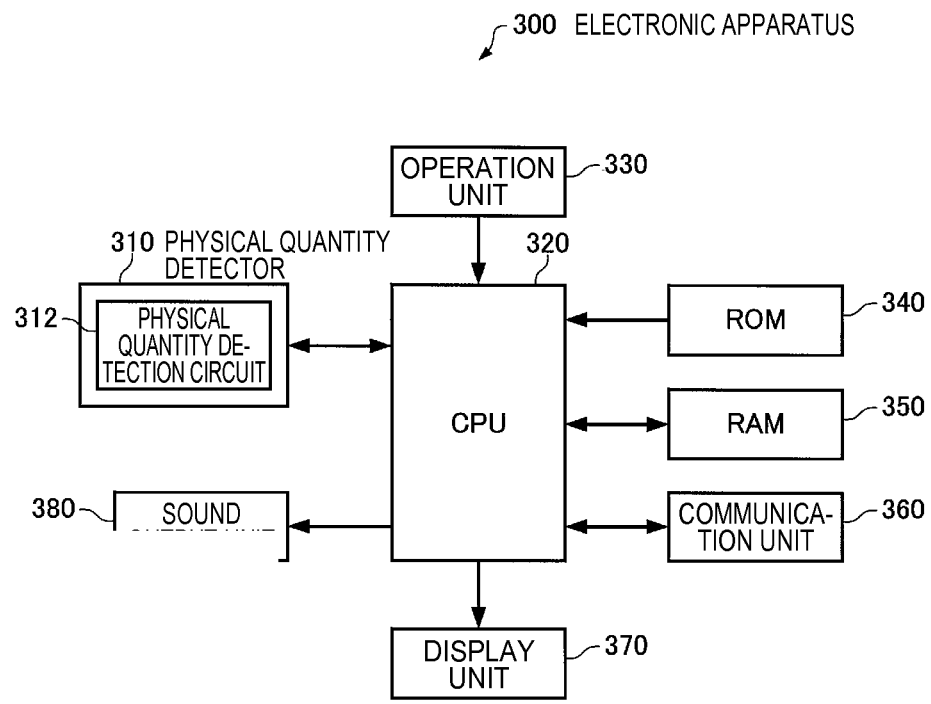
FIG. 11 is a functional block diagram of an electronic apparatus of the embodiment.
Figure 12:
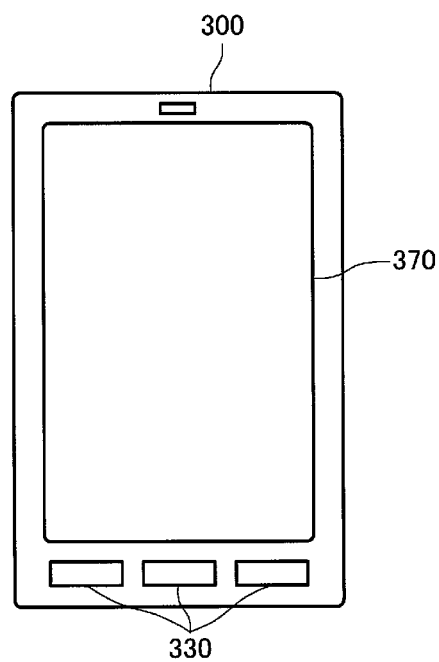
FIG. 12 shows an example of an appearance of the electronic apparatus of the embodiment.

FIG. 11 is a functional block diagram of an electronic apparatus of the embodiment. Further, FIG. 12 shows an example of an appearance of a smartphone as an example of the electronic apparatus of the embodiment.

The electronic apparatus 300 of the embodiment includes a physical quantity detector 310, a CPU (Central Processing Unit) 320, an operation unit 330, a ROM (Read Only Memory) 340, a RAM (Random Access Memory) 350, a communication unit 360, a display unit 370, and a sound output unit 380. Note that the electronic apparatus of the embodiment may have a configuration in which part of the component elements (respective parts) of FIG. 11 are omitted or changed or another component element is added.

The physical quantity detector 310 is a device that detects a physical quantity and outputs a signal (physical quantity signal) at a level in response to the detected physical quantity, and may be an inertial sensor that detects at least a part of a physical quantity including acceleration, an angular velocity, a velocity, angular acceleration, a force, or a clinometer that measures an inclination angle. As the physical quantity detector 310, for example, the physical quantity detector 1 of the above described embodiment may be applied. Further, the physical quantity detector 310 includes a physical quantity detection circuit 312 and, as the physical quantity detection circuit 312, for example, the physical quantity detection circuit 12 of the above described embodiment may be applied.

The CPU 320 performs various kinds of calculation processing and control processing using the physical quantity signals output by the physical quantity detector 310 according to programs stored in the ROM 340 etc. In addition, the CPU 320 performs various kinds of processing in response to operation signals from the operation unit 330, processing of controlling the communication unit 360 for data communication with the outside, processing of transmitting display signals for the display unit 370 to display various kinds of information, processing for the sound output unit 380 to output various sounds, etc.

The operation unit 330 is an input device including an operation key, a button switch, etc., and outputs an operation signal in response to operation by a user to the CPU 320.

The ROM 340 stores programs, data, etc. for the CPU 320 to perform various kinds of calculation processing and control processing.

The RAM 350 is used as a work area of the CPU 320, and temporarily stores programs and data read out from the ROM 340, data input from the operation unit 330, calculation results executed by the CPU 320 according to the various programs, etc.

The communication unit 360 performs various kinds of control for establishing data communication between the CPU 320 and an external device.

The display unit 370 is a display device including an LCD (Liquid Crystal Display) or an organic EL display, and displays various kinds of information based on display signals input from the CPU 320. A touch panel that functions as the operation unit 330 may be provided in the display unit 370.

The sound output unit 380 is a device that outputs sound such as a speaker.

By incorporation of the detection circuit 12 of the above described embodiments as the physical quantity detection circuit 312, an electronic apparatus with high reliability at low cost may be realized.

Various kinds of electronic apparatuses may be considered as the electronic apparatus 300, including a personal computer (e.g., a mobile personal computer, a laptop personal computer, a notebook personal computer, a tablet personal computer), a mobile terminal such as a cell phone, a digital still camera, an inkjet ejection device (e.g., an inkjet printer), a storage area networking apparatus such as a router and a switch, a local area networking apparatus, a television, a video camera, a video tape recorder, a car navigation system, a pager, a personal digital assistance (with or without communication function), an electronic dictionary, a calculator, an electronic game machine, a game controller, a word processor, a work station, a videophone, a security television monitor, electronic binoculars, a POS terminal, a medical device (for example, an electronic thermometer, a sphygmomanometer, a blood glucose meter, an electrocardiographic measurement system, an ultrasonic diagnostic system, or an electronic endoscope), a fish finder, various measurement instruments, meters and gauges (for example, meters for vehicles, airplanes, and ships), a flight simulator, a head-mounted display, a motion trace, a motion tracker, a motion controller, a PDR (pedestrian dead reckoning), etc., for example.

3. Moving Object

Figure 13:
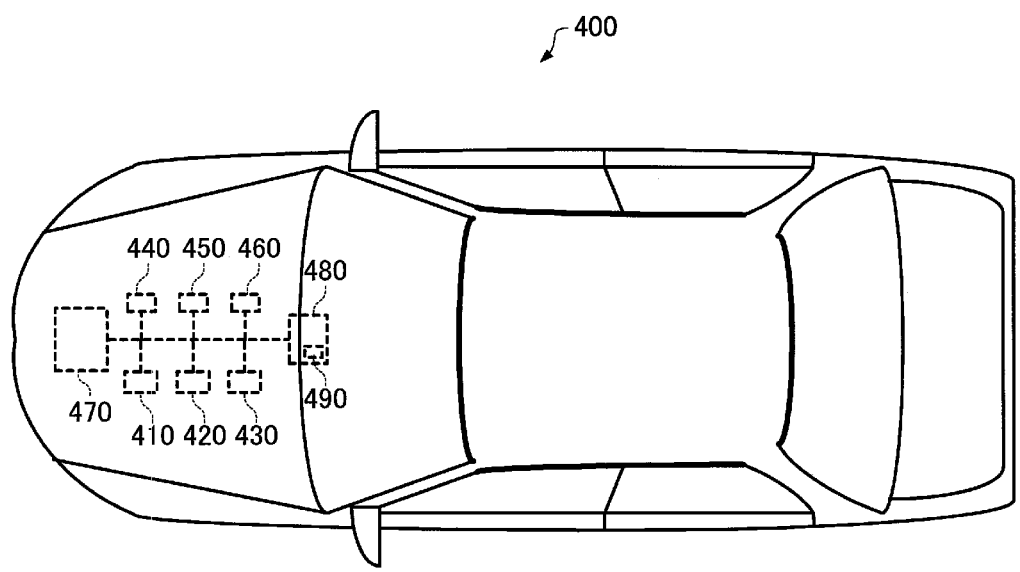
FIG. 13 shows an example of a moving object of the embodiment.

FIG. 13 shows an example of a moving object of the embodiment (top view). The moving object 400 shown in FIG. 13 includes physical quantity detectors 410, 420, 430, controllers 440, 450, 460, a battery 470, and a navigation device 480. Note that the moving object of the embodiment may have a configuration in which part of the component elements (respective parts) of FIG. 13 are omitted or changed or another component element is added.

The physical quantity detectors 410, 420, 430, the controllers 440, 450, 460, and the navigation device 480 operate by a power supply voltage supplied from the battery 470.

The controllers 440, 450, 460 perform various kinds of control of a position control system, an overturn prevention system, a brake system, etc. using part or all of the physical quantity signals output by the physical quantity detectors 410, 420, 430, respectively.

The navigation device 480 displays various kinds of information including the position and the time of the moving object 400 based on output information of a built-in GPS receiver (not shown) on a display. Further, the navigation device 480 contains a physical quantity detector 490 and performs calculation of the position and the orientation of the moving object 400 based on output signals of the physical quantity detector 490 even when radio wave of GPS does not reach, and continues display of necessary information.

The physical quantity detectors 410, 420, 430, 490 are devices that output signals (physical quantity signals) at levels in response to detected physical quantities, and respectively an angular velocity sensor, an acceleration sensor, a velocity sensor, a clinometer, or the like, for example. The physical quantity detectors 410, 420, 430, 490 include physical quantity detection circuits (not shown) that correct output signals of sensor devices (not shown) due to changes in temperature and power supply voltage and output physical quantity signals.

For example, as the physical quantity detection circuits in the physical quantity detectors 410, 420, 430, 490, the detection circuit 12 of the above described embodiment may be applied or, as the physical quantity detectors 410, 420, 430, 490, the physical quantity detector 1 of the above described embodiment may be applied, and thereby, high reliability may be secured at low cost.

As the moving object 400, various moving objects are considered, including an automobile (including an electric car), an airplane such as a jet plane and a helicopter, a ship, a rocket, an artificial satellite, etc. for example.

Note that the invention is not limited to the embodiments, but various modifications may be implemented within the scope of the invention.

Figure 14:
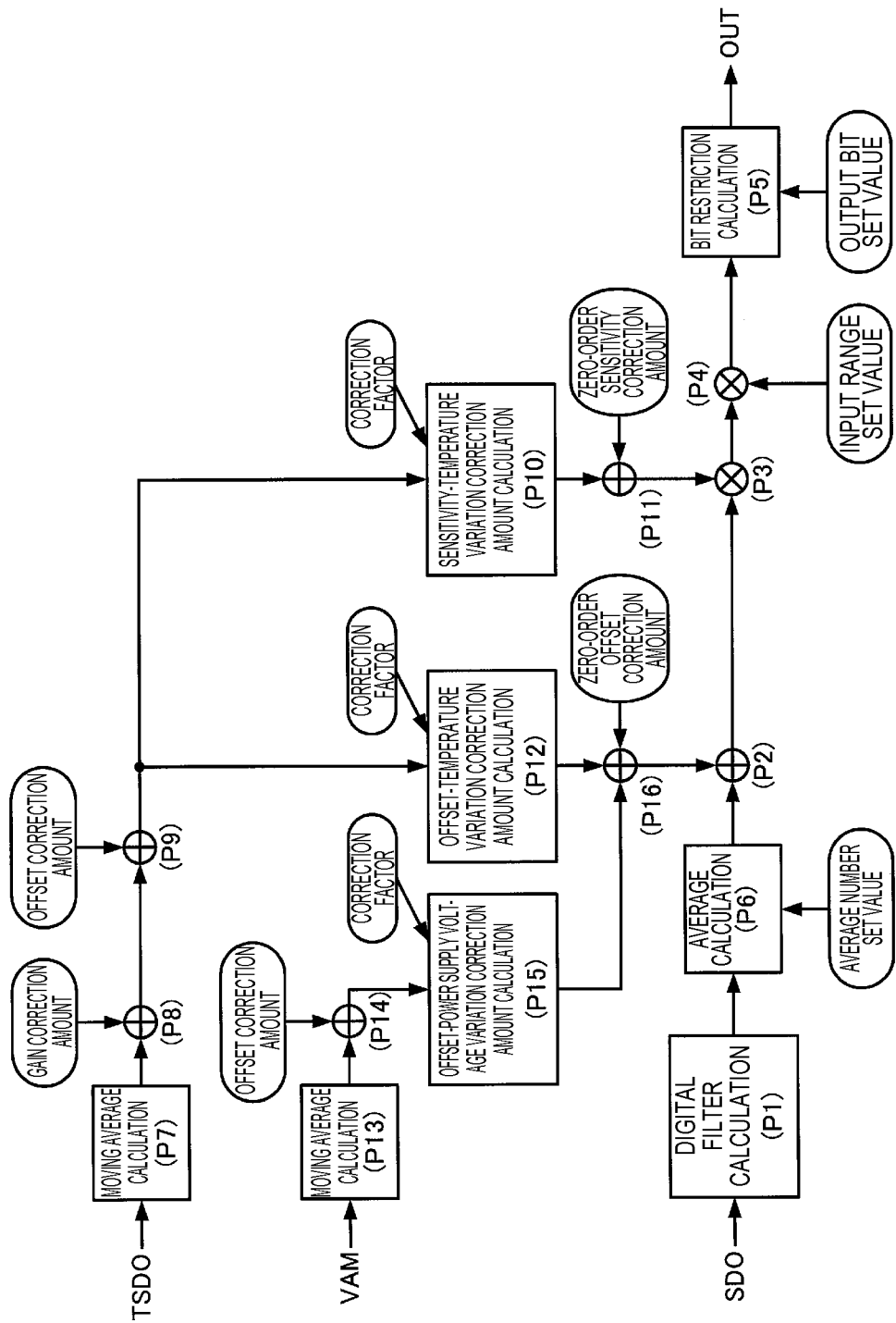
FIG. 14 shows a flow of calculation processing performed by a digital calculation circuit in a modified example.

For example, in the embodiment, the digital calculation circuit 108 performs the average calculation of the angular velocity data last, however, may be modified to perform the processing before the other part or all of the calculation processing. For example, as shown in FIG. 14, the digital calculation circuit 108 may be modified to perform the average calculation of the angular velocity data (P6) immediately after the digital filter calculation (P1), and perform the subsequent offset correction calculation (P2), sensitivity correction calculation (P3), input range calculation (P4), and bit restriction calculation (P5) at the update rate of the averaged angular velocity data (the rate of 1/N of the sampling rate $f_1$). In this manner, as the average number set value N is larger, the amount of calculations of P2 to P4 may be effectively reduced.

Further, for example, the vibrating reed of the sensor device 30 is not necessarily the double-T-shaped, but may have a tuning-fork shape or comb-like shape, or a tuning bar having a shape of triangular prism, quadrangular prism, cylinder, or the like. Further, as a material of the vibrating reed of the sensor device 30, in place of crystal ($SiO_2$), for example, a piezoelectric material such as piezoelectric single crystal including lithium tantalate ($LiTaO_3$) and lithium niobate ($LiNbO_3$), or piezoelectric ceramics including PZT (lead zirconate titanate) may be used, or silicon semiconductor may be used. Furthermore, for example, a structure in which a piezoelectric thin film of zinc oxide (ZnO), aluminum nitride (AlN), or the like sandwiched between drive electrodes may be provided on apart of the surface of the silicon semiconductor.

In addition, for example, the sensor device 30 is not limited to the piezoelectric sensor device, but may be a vibration sensor device of conductor type, capacitance type, eddy-current type, optical type, or strain-gauge type. Or, the system of the sensor device 30 is not limited to the vibration system, but may be an optical system, a rotational system, or a hydraulic system, for example. Further, the physical quantity detected by the sensor device 30 is not limited to the angular velocity, but may be angular acceleration, acceleration, a velocity, a force, or the like.

Further, in the above described embodiments, the physical quantity detector that detects the angular velocity as the physical quantity is shown, however, the invention may be applied to a physical quantity detector that detects a physical quantity, not limited to the angular velocity, but acceleration, velocity, angular acceleration, force, or the like.

The above described embodiments are just examples, but not limited to those. For example, the respective embodiments may be appropriately combined.

The invention includes substantially the same configurations (the same configurations in function, method, and result or the same configurations in purpose and advantage) as the configurations explained in the embodiments. Further, the invention includes configurations in which non-essential parts of the configurations explained in the embodiments are replaced. Furthermore, the invention includes configurations that may exert the same effects or achieve the same purposes as those of the configurations explained in the embodiments. In addition, the invention includes configurations formed by adding known technologies to the configurations explained in the embodiments.

The entire disclosure of Japanese Patent Application No. 2013-091037, filed Apr. 24, 2013 is expressly incorporated by reference herein.

What is claimed is:

1. An electronic apparatus comprising:
    an integrated circuit including a physical quantity detection circuit configured to measure a physical quantity and generate a detection signal based on the physical quantity, the physical quantity detection circuit including (i) a calculation processor configured to perform calculation processing of generating calculation data that represents the measured physical quantity and includes a number of bits in response to a magnitude of the physical quantity based on detection data formed by digitalization of the detection signal corresponding to the physical quantity and (ii) a register, wherein the calculation processor is configured to generate the calculation data by sampling the detection signal at a sampling rate $f_1$ and outputting the calculation data at a sampling rate $f_2$ that is less than the sampling rate $f_1$, and
    an information processor configured to sample the calculation data in at the sampling rate $f_2$ and perform information processing based on the calculation data,
    wherein, to output the calculation data representing the measured physical quantity at the sampling rate $f_2$, the calculation processor is configured to
        store, in the register, an integer number N that varies based on a relationship between the sampling rate $f_1$ and the sampling rate $f_2$ of the information processor,
        based on the integer number N stored in the register, perform average processing to average N continuous values of the calculation data such that the number of the N continuous values that is averaged causes an update rate of the calculation data as received by the information processor to correspond to the sampling rate $f_2$, wherein the calculation processor performs the average processing at the end of the calculation processing and
        output the calculation data to the information processor at a rate that is based on the sampling rate $f_2$.

2. The electronic apparatus according to claim 1, wherein the calculation processor generates the calculation data at a rate of 1/N of a sampling rate of the digitalization of the detection signal.

3. The electronic apparatus according to claim 2, further comprising:
    a sensor device that outputs the detection signal corresponding to the physical quantity.

4. The electronic apparatus according to claim 1, wherein the calculation processing includes offset correction processing and sensitivity correction processing on the data generated by the average processing.

5. The electronic apparatus according to claim 1, further comprising
    a sensor device that outputs the detection signal corresponding to the physical quantity.

6. The electronic apparatus according to claim 1, wherein the integer N is defined by the following equation (1):

$$N = \mathrm{round}(f_1/f_2) \tag{1}$$

where round is a function of rounding a value off to an integer.

* * * * *